United States Patent [19]
Yoshimatsu

[11] Patent Number: 6,101,330
[45] Date of Patent: *Aug. 8, 2000

[54] PAY PHOTOGRAPH PRODUCING APPARATUS

[75] Inventor: Morio Yoshimatsu, Kangawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/988,818

[22] Filed: Dec. 12, 1997

[30] Foreign Application Priority Data

Dec. 20, 1996 [JP] Japan ................................. 8-341625

[51] Int. Cl.[7] ............................ G03B 15/00; B41J 32/00; G03G 15/00
[52] U.S. Cl. ................................ 396/2; 347/214; 395/12
[58] Field of Search ..................... 235/462, 468, 235/472, 491; 399/79, 80, 12, 13, 8; 347/86, 214; 396/2

[56] References Cited

U.S. PATENT DOCUMENTS

| | | | |
|---|---|---|---|
| 4,359,633 | 11/1982 | Bianco | 235/468 |
| 4,870,260 | 9/1989 | Niepolomski et al. | 235/494 |
| 4,961,088 | 10/1990 | Gilliland et al. | 399/25 |
| 5,717,381 | 2/1998 | Jagielinski et al. | 340/551 |
| 5,760,384 | 6/1998 | Itoh et al. | 235/468 |

FOREIGN PATENT DOCUMENTS

| | | |
|---|---|---|
| 0 407 005 | 1/1991 | European Pat. Off. . |
| 3514881 | 10/1986 | Germany . |
| WO 93/21612 | 10/1993 | WIPO . |

*Primary Examiner*—William Royer
*Assistant Examiner*—Hoang Ngu
*Attorney, Agent, or Firm*—Frommer Lawrence & Haug, LLP.; William S. Frommer

[57] ABSTRACT

A pay photograph producing apparatus according to the present invention is one for printing a picture of an optional video signal when money or its substitute is put in, and includes a password means attached to a cartridge for a printing material and/or a cartridge for a printing paper, a means for reading the password means at a time of the cartridge being loaded, and a means for allowing the printing only when the password means is correct.

5 Claims, 8 Drawing Sheets

PAY PHOTOGRAPH PRODUCING APPARATUS

BACKGROUND OF THE INVENTION

1. Field of the Invention

The present invention relates to a pay photograph producing apparatus which employs a technology on a video signal and is suitable for business use, for example.

2. Description of the Related Art

For example, a conventional pay photograph producing apparatus for business use installed in a city uses a so-called photograph material of an instant type and is supposed to immediately produce a print of a shot photograph.

With an apparatus using such photograph materials, however, it is impossible to retouch the shot photograph. For example, when a size of an object is to be determined, preparatory adjustments are conducted such as changes in distance to a camera, replacements of lenses and so on before photographing is conducted. Therefore, if a produced print is not to be desired, photographing has to be conducted again and as a result, superfluous money and extra time are added.

Also, in a case of producing four photographs, for example, an apparatus using the conventional materials conducts four photographing. Accordingly, these photographs can't be the same and are inappropriate for photographs for a certificate and the like which demand the sameness of the photographs.

Meanwhile, in a sector of civil equipment, for example, a video signal which is photographed by a video camera is supplied to a video printer to produce a photograph. In this case, the photograph is produced by memorizing one frame or one field of the video signal in a memory. Therefore, the video signal memorized then is supplied, for example, to a video monitor so that confirmation of a screen and the like can be conducted.

Accordingly, the inventor of this patent application formerly proposed an apparatus in which a photograph is easily produced by employing such a technology on a video signal (see Japanese patent applications Nos. 7-190717, 7-287522, 7-304777 and so on).

Figure 1:
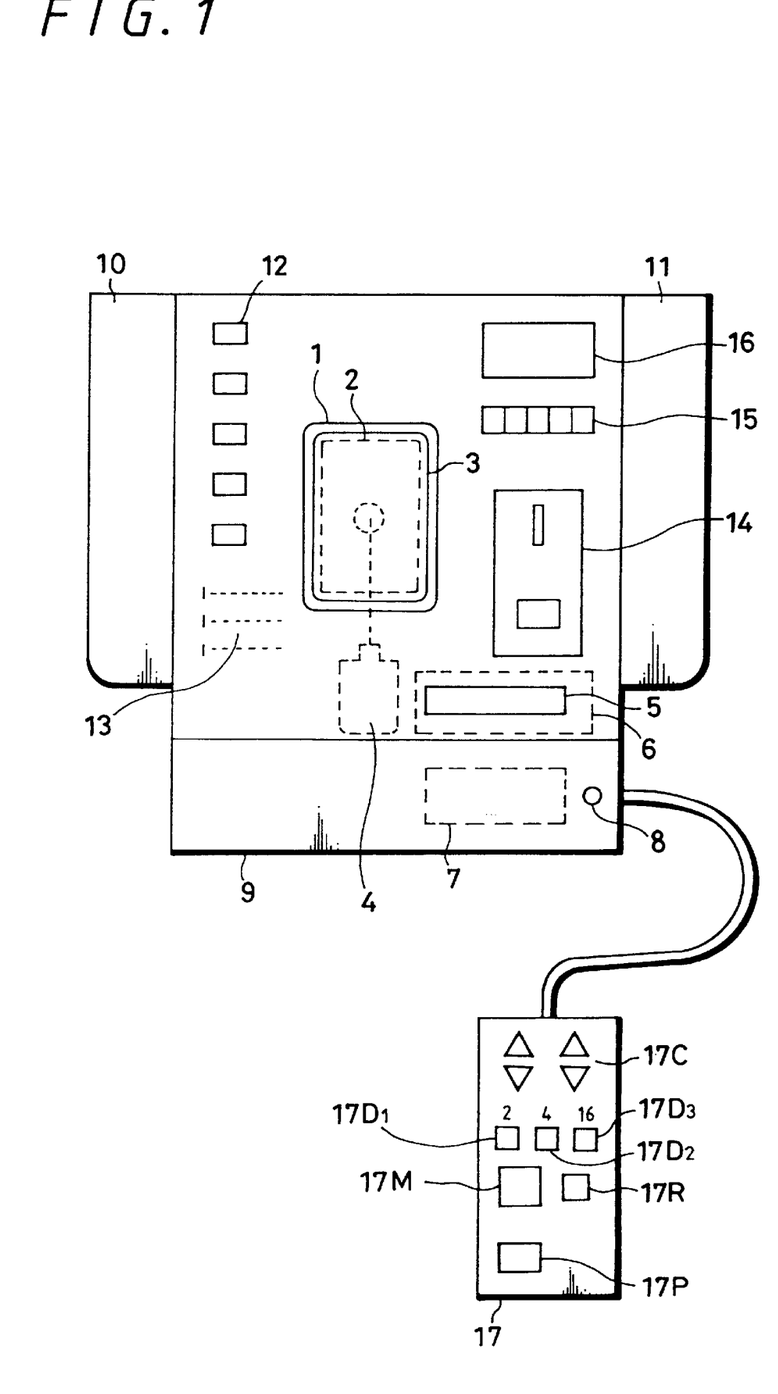
FIG. 1 is a structural diagram for explaining a pay photograph producing apparatus.

That is, FIG. 1 is a front view showing an arrangement of one example of the pay photograph producing apparatus which the inventor of this patent application formerly proposed.

In this FIG. 1, at the center of the apparatus is provided a window portion 1 and at the back of the window portion 1 is provided, for example, a screen of a video monitor 2 and at the same time, in front of the screen, for example, a half mirror 3 is provided, and by way of the half mirror 3, a lens of a video camera 4 is positioned so as to be at a site equivalent to the center of the screen. In addition, the video monitor 2 and the video camera 4 are arranged in a sideways state relative to the object so that a vertically long screen used for a portrait is photographed and displayed.

Also, on a lower portion of the apparatus is provided a take-out mouth 5 for a produced photograph (a print) and in recesses of the take-out mouth 5 is arranged a video printer 6.

Further, a paper supplying tray 7 for supplying a print paper to the video printer 6 is provided on an inner side of a door 9, wherein a key 8 is provided. Also, lighting apparatus 10, 11 for illuminating the object are provided on the left and right sides of the apparatus.

Further, on the left side of the above mentioned window portion 1 is provided a selection button 12 for selecting a background color (back color) of the object, and a description 13 of explanatory sentences about operational procedures of the apparatus is provided below the selection button. Also, on the right side of the above mentioned window portion 1 is provided a coin counter 14 and at the same time, a display unit 15 for the amount of put-in money in coin and the like as well as a printer 16, for example, of a thermosensitive type for issuing a receipt are provided at an upper portion of the coin counter 14.

Further, a remote commander apparatus 17 is connected to the above mentioned video printer 6 and through the remote commander 17, controls of the above mentioned video camera 4 and video printer 6 are conducted. On the commander apparatus 17 is provided a camera manipulating button 17C for controlling photographing directions (up and down) and zooming (enlargement and reduction of a picture) of the above mentioned video camera 4.

Also, at the remote commander 17 are provided a photographing (memory) button 17M, a re-photographing button 17R, a print button 17P, setting buttons $17D_1$, $17D_2$, $17D_3$ and the like for setting a size of a screen to be printed, for example, to ½ division, ¼ division and ⅟₁₆ division, which will be explained later on.

Figure 2:
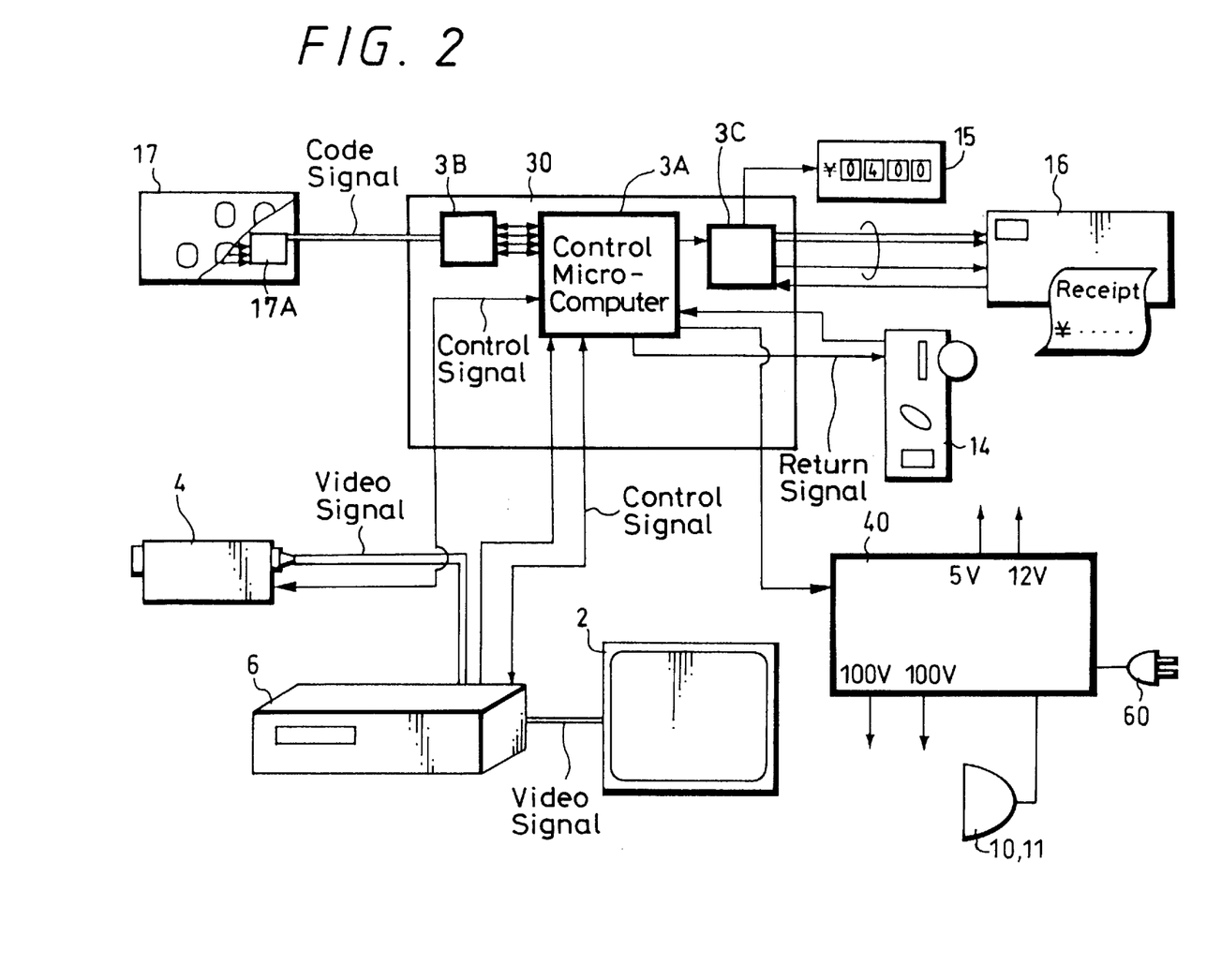
FIG. 2 is a circuit block diagram for explaining the pay photograph producing apparatus.

Further, FIG. 2 is a systematic diagram for showing connecting relations among the above mentioned respective apparatuses. In FIG. 2, a photographed video signal by the above mentioned video camera 4 is supplied to the video printer 6. The video signal supplied to the video printer 6 is memorized, for example, in a built-in picture memory (not shown) and the memorized video signal in the picture memory of the video printer 6 is supplied to the video monitor 2.

Also, a main substrate 30 is provided, and between a control micro-computer 3A on the main substrate 30 and main bodies of the video camera 4 and the video printer 6, communication of predetermined control signals is conducted.

Further, the operating signals of the respective buttons on the remote commander apparatus 17 are converted into predetermined code signals by a signal converting micro-computer 17A and supplied to the control micro-computer 3A through a micro-computer 3B on the main substrate 30. Also, the control micro-computer 3A and the printer 16 communicate each other through a micro-computer 3C on the main substrate 30.

Further, information concerning put-in money from the coin counter 14 is supplied to the control micro-computer 3A and at the same time, a control signal for a refund and the like is supplied therefrom to the coin counter 14. Also, a signal from the control micro-computer 3A is supplied to the money display unit 15 through the micro-computer 3C, and the amount of put-in money from the coin counter 14 and a balance and the like after the apparatus is driven are displayed.

Further, a power source substrate 40 is provided. A commercial power source from a power source plug 60 is supplied to the power source substrate 40. A power source of 100v, for example, is applied to the video monitor 2, the video printer 6, the pair of lighting apparatus 10, 11 and the like and at the same time, a power source of 5v or 12v is applied to the main substrate 30, the printer 16 and the like. Also, the power source substrate 40 is controlled by the control micro-computer 3A.

Figure 3A:
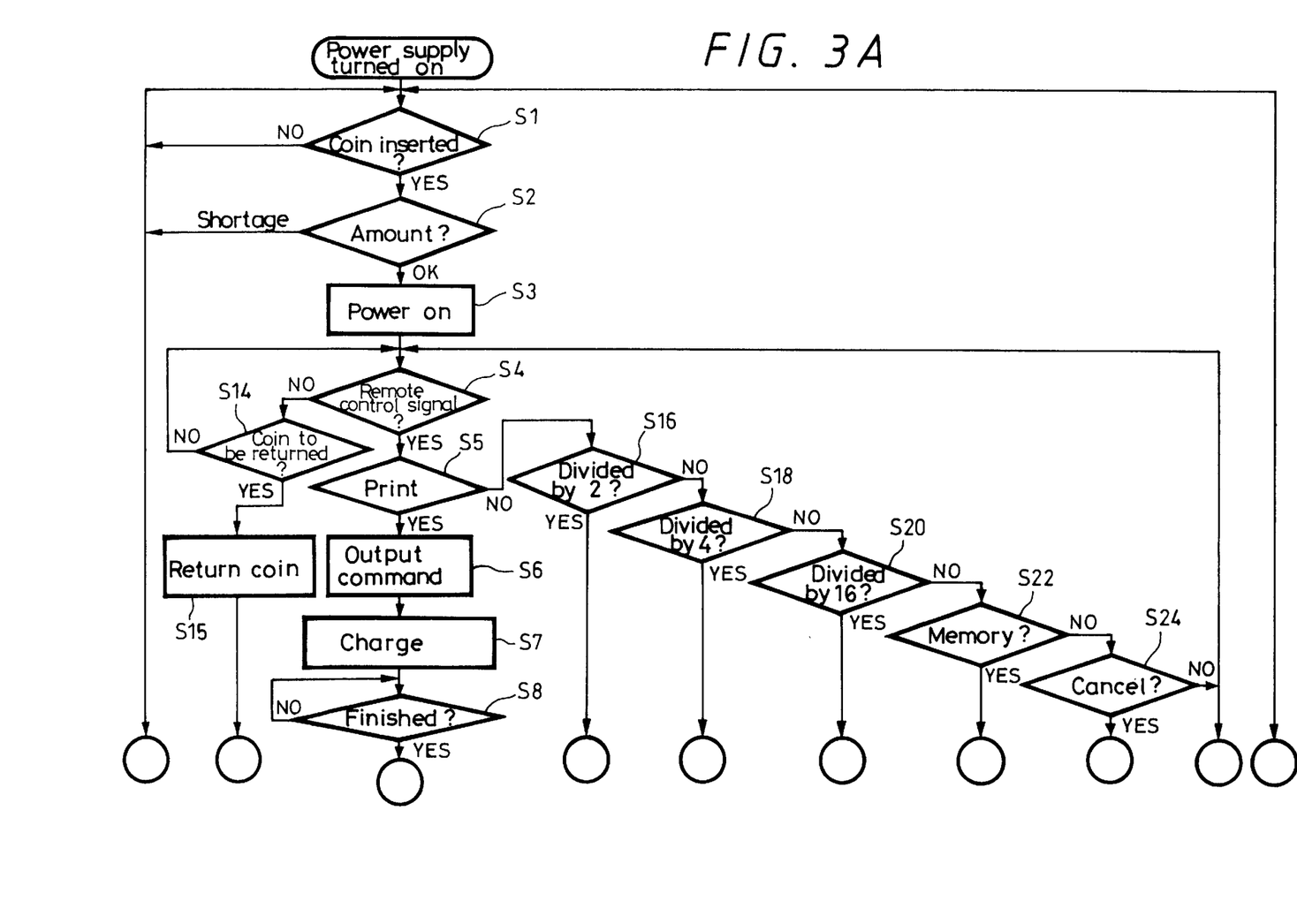
FIGS. 3A and 3B are flowcharts for explaining the pay photograph producing apparatus.
Figure 3B:
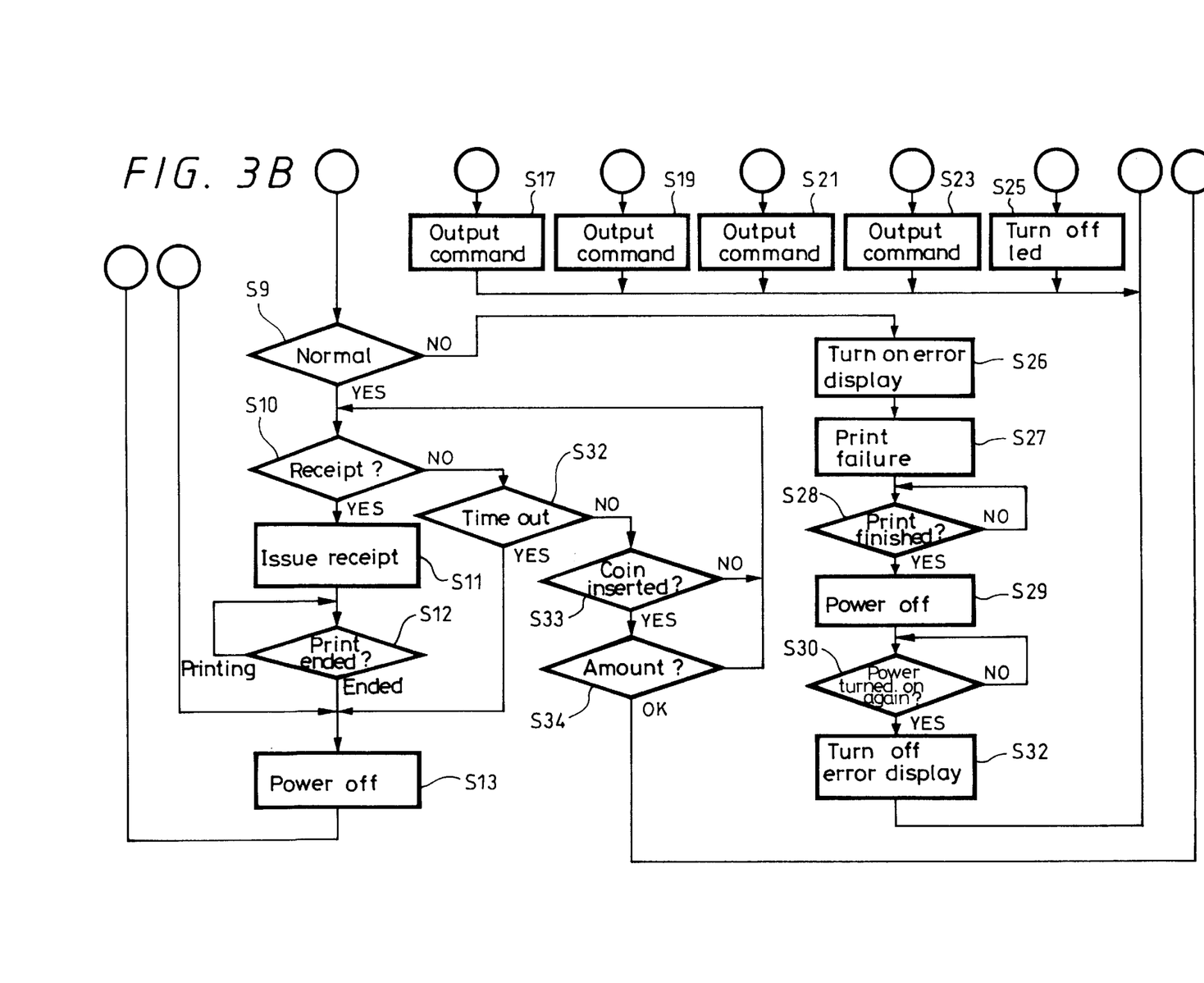

In the apparatus, control by the control micro-computer 3A is conducted, for example, as is shown by a flowchart in FIGS. 3A and 3B.

That is, in FIG. 3A, when a power source is turned on, it is judged at step [1] whether or not money is put into the coin counter 14. While money is not put in, step [1] is repeated. Further, when money is put into the coin counter 14 at step [1], the amount of the put-in money is judged at step [2]. When the amount is short, the processing is returned to step [1].

Meanwhile, when the amount of money is sufficient at step [2], processing of power on is conducted at step [3]. In the power on processing, the power sources to the video monitor 2, the video camera 4, the video printer 6, the illumination lights 10, 11 and the remote commander apparatus 17 are energized on the power source substrate 40.

Further, it is judged at step [4] whether or not there is a remote control signal from the remote commander apparatus 17. When there is the signal, it is judged whether or not contents of the remote controller signal are a print (button 17P). When the contents are a print, a command for printing a picture memorized in the picture memory is outputted to the video printer 6 at step [6].

Also, at step [7], money charging processing is conducted. In the money charging processing, receiving of the above put-in money is conducted. Until the money charging processing is conducted, put-in money is kept. Further, at step [8], it is judged whether or not a display signal indicating completion of printing is returned from the video printer 6. Until the display signal indicating the completion of the printing returns, step [8] is being repeated.

Further, when the display signal indicating the completion of the printing is returned, at step [9] in FIG. 3B it is judged whether or not action is normally finished, and when the action is normally finished, whether or not a receipt is requested is judged at step [10]. When requested, receipt issuing processing is conducted at step [11]. That is, a data on the amount of the received money in the money charging processing at step [7] is supplied to the printer 16 and the receipt is printed.

Also, at step [12], it is judged whether or not a display signal indicating completion of the printing is returned from the printer 16. Until the display signal indicating the completion of the printing is returned, step [12] is being repeated. Further, when the display signal indicating the completion of the printing is returned from the printer 16, at step [13], processing of power off is conducted.

In the power off processing, the power sources of the video monitor 2, the video camera 4, the video printer 6, the illumination lights 10, 11 and the remote commander apparatus 17 are cut off. Further, after the power off processing is finished at step [13], the processing is returned to step[1].

Also, at the above mentioned step [4], when there isn't a remote control signal, at step [14] it is judged whether or not a refund is requested. When refund is requested, at step [15] a command for refunding the above mentioned kept money is outputted to the coin counter 14. When the refund isn't requested at step [14], the processing is returned to step [4] and the action is repeated.

Further, when the contents of the remote control signal are not about the printing at the above mentioned step [5], it is judged at step [16] whether or not the contents of the remote control signal are ½ division (the button 17 D$_1$). When they are the ½ division, at step [17], a command is issued to the video printer 6 so that a picture memorized in the picture memory is reduced to ½ in size to produce two screens, and the processing is returned to step [4].

Further, at the above mentioned step [16], when contents of the remote control signal are not about the two screens, at step [18] it is judged whether or not the contents of the remote control signal are ¼ division (the button 17D$_2$).

When they are the ¼ division, at step [19], a command is issued to the video printer 6 so that a picture memorized in the picture memory is reduced to ¼ each in size to produce four screens and the processing is returned to step [4].

Further, at the above mentioned step [18], when contents of the remote control signal are not about the four screens, at step [20], it is judged whether or not the contents of the remote control signal are 1/16 division (the button 17D$_3$). When they are the 1/16 division, at step [21], a command is issued to the video printer 6 so that a picture memorized in the picture memory is reduced to 1/16 each in size to produce sixteen screens and the processing is returned to step[4].

Figure 4A:
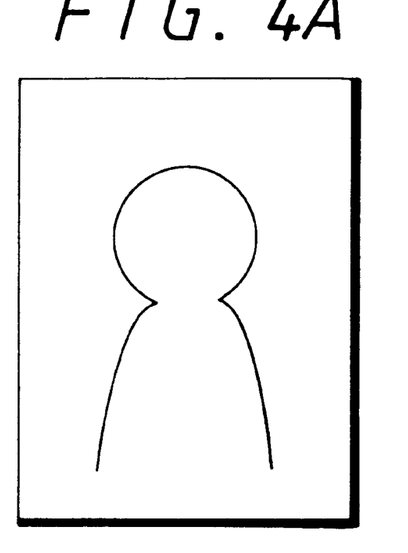
FIGS. 4A to 4D are diagrams for explaining the pay photograph producing apparatus.
Figure 4B:
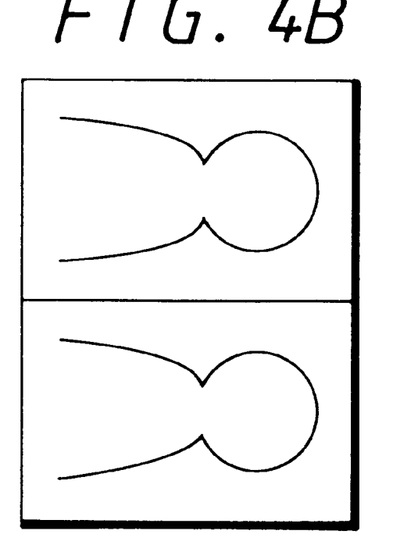
Figure 4C:
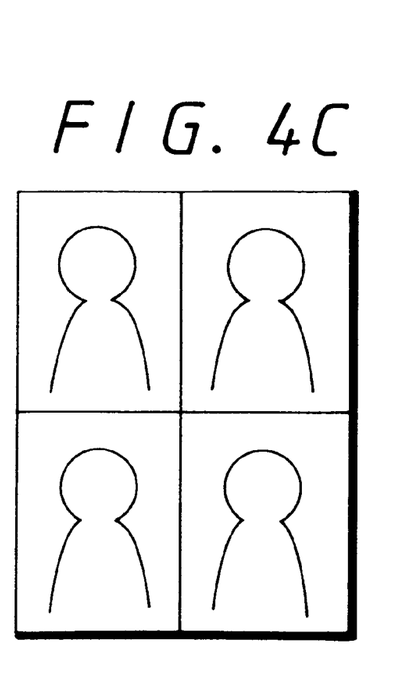
Figure 4D:
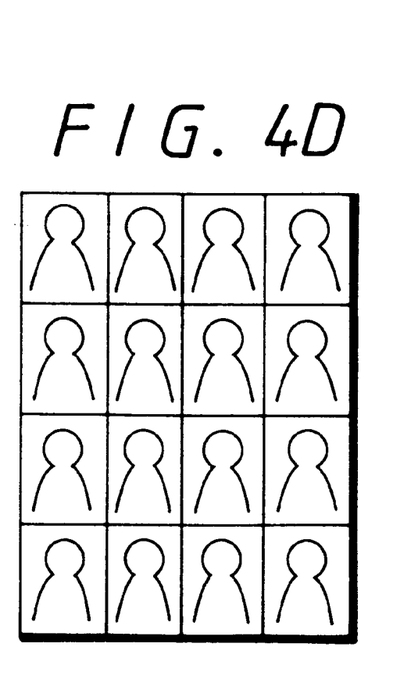

Therefore, by those steps [16]-[21], a picture as shown in FIG. 4A, for example, is reduced respectively to ½, ¼, 1/16 in size and as FIGS. 4B to 4D respectively show, pictures with two screens, four screens, sixteen screens are formed. Then, the processing is returned to step [4], and at step [5], when contents of the remote control signal are the print, those pictures are printed.

Also, at the above mentioned step [20], when contents of the remote control signal are not the 1/16 division, at step [22] it is judged whether or not the contents of the remote control signal are photographing (the button 17 M). Then, at a time of photographing, at step [23] a command is issued to the video printer 6 so that photographing is conducted by the video camera 4 or a video signal supplied to a video input terminal 19 is memorized in the picture memory and the processing is returned to [4].

Further, at the above mentioned step [22] when contents of the remote control signal are not the photographing, at step [24] it is judged whether or not the contents of the remote control are re-photographing (the button 17R). When the contents are re-photographing, at step [25] a function display LED (not shown) is extinguished and the processing is returned to step [4]. Also, at step [24] when contents of the remote control signal are not re-photographing, the process is returned to step [4] as it is.

Further, when actions are not normally finished at the above mentioned step [9], at step [26] the above mentioned function display LED is lightened on. Also, at step[27], a process for issuing a letter of trouble processing is conducted. That is, a data on the trouble letter indicating that actions are not normally finished at step [9] is supplied to the printer 16 and the trouble letter is printed.

Further, at step [28] it is judged whether or not a display signal indicating completion of the printing is returned from the printer 16 and until the display signal indicating completion of the printing returns, this step [28] is being repeated. When the display signal indicating completion of the printing is returned from the printer 16, power off processing is conducted at step [29].

Further, at step [30], it is judged whether or not turning on of a power source is resumed and until the trouble is removed and the power source is turned on again, this step [30] is repeated. When the power source is turned on again, the above mentioned function display LED is extinguished and the processing is returned to step [1].

Further, when a receipt is not requested at step [10], at step [32] it is judged whether or not a predetermined time has passed (time out), and when the time has passed, the processing proceeds to step [13]. Also, until the predetermined time passes at step [32], at step [33], whether or not money is put in the coin counter 5 is judged.

While there is no money put in, the processing is returned to step [10]. Further, when there is money put in the coin counter 5 at step [32], the amount of the put-in money is judged at step [34] and when the amount of the money is short, the processing is returned to step [10]. On the contrary, when the amount of money is sufficient, the processing is returned to step [4] and signal processing from the remote commander apparatus 17 is conducted again.

Also, when the above mentioned N division (N=2, 4, 16) processing is conducted, for example, by conducting processings with the same procedures as in the above mentioned steps [16] to [21], it is possible to construct a divided screen by another pictures at N/M (M=1,2,3,4) each.

Therefore, in the above-mentioned apparatus, by application of technologies on a video signal, it is possible for the video printer 6 to print a photographed picture taken by the video camera 4 as well as produce a desired photograph after ascertaining the photographed picture on the video monitor 2.

Also, it is possible to produce a plural number of the same photograph by printing a picture memorized in the memory. Further, enlargement, reduction and division of a picture can be easily conducted and production of a photograph of an optional size can be easily conducted. Also, a receipt for a charge can be issued by the printer apparatus 16.

Meanwhile, in the above mentioned apparatus, in stead of the coin counter 14, an apparatus which is driven by put-in of substitutes for money such as a pre-paid card and the like are may be used.

By the way, in the above mentioned pay picture producing apparatus, printing by the video printer 6 is conducted by, for example, a sublimation type thermal printing system. In the case, printing materials used for printing such as an ink ribbon and the like must be appropriate for printing characteristics or the like of the video printer 6 in order to guarantee a picture of good quality.

Therefore, in the prior art such counter-measures have been taken, by which a cartridge having printing material accommodated therein is made to have a specified shape while the video printer 6 is made incapable of loading a cartridge of another shape so that printing materials and the like the characteristics of which are not appropriate are not used for printing.

In spite of those counter-measures, however, a pirate cartridge having a similar outer shape and bad quality has emerged on the market. As a result, when such a pirate cartridge is used, a situation will arise in which not only there can be no guaranteeing a printed picture of good quality but also fear will arise that in the video printer 6 the ink ribbon gets tangled and a print head is damaged or the like and hence reliability of the apparatus is impaired.

SUMMARY OF THE INVENTION

In view of those aspects, it is an object of the present invention to solve the problem that when a pirate cartridge is used in a conventional apparatus, there is no guaranteeing of a printed picture of good quality and a situation occurs that reliability of the apparatus will be impaired because of an ink ribbon getting tangled, and damages to a print head and the like.

According to an aspect of the present invention, a pay photograph producing apparatus is one for printing a picture of an optional video signal when money or its substitute is put in, and includes a password means attached to a cartridge for a printing material and/or a cartridge for a printing paper, a means for reading the password means at a time of the cartridge being loaded, and a means for allowing the printing only when the password means is correct.

DESCRIPTION OF THE PREFERRED EMBODIMENT

Briefly, the present invention, in a pay photograph producing apparatus in which money or its substitutes are put in to print a picture in terms of optional video signals, attaches a password means to a cartridge for printing materials and/or to a cartridge for printing paper and at the same time, has a means for reading the password means at a time of a cartridge being loaded as well as an arrangement for allowing printing only when the password means is right.

Figure 5:
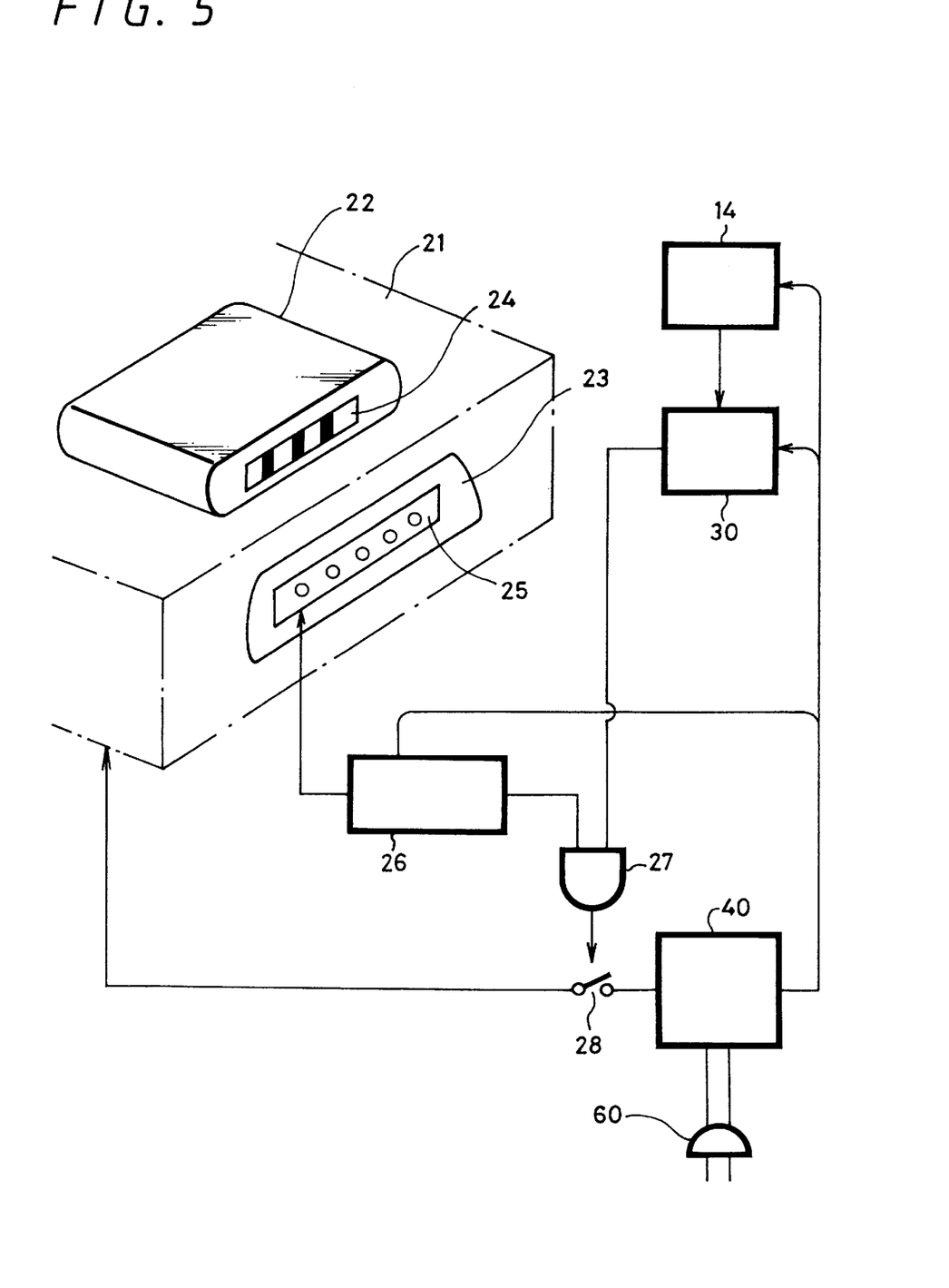
FIG. 5 is a block diagram showing one example of an essential part of a pay photograph producing apparatus to which the present invention is applied.

Hereinafter, the present invention will be described with reference to the drawings. FIG. 5 is a block diagram showing an arrangement of an essential part of one example of a pay photograph producing apparatus to which the present invention is applied.

In FIG. 5, an apparatus 21 illustrated by a one-dot-line corresponds to the above mentioned video printer 6. A cartridge 22 for the above mentioned printing materials is loaded to the video printer apparatus 21, where printing of an optional video signal is conducted. Meanwhile, drawings and explanations of a practical print arrangement and the like will be omitted as they are well known.

Further, the video printer apparatus 21 is provided with a lid body 23 for covering a loading unit of the above mentioned cartridge 22. Also, a surface of the cartridge 22 which becomes a lid body 23 side when the cartridge 22 is loaded is provided with a password means 24. Further, an inside surface of the lid body 23 opposite to the password means 24 is provided with a reading means 25 for reading the password means 24.

Then, when the above mentioned cartridge 22 is loaded to the video printer apparatus 21, the password means 24 is read by the reading means 25 and a read signal therefrom is supplied to a judge circuit 26. As a result, whether or not a correct password means 24 has been read is judged by the judge circuit 26.

Further, information concerning put-in money from the above mentioned coin counter 14 is supplied to the main substrate 30 including the control micro-computer 3A (not shown). As a result, whether or not printing is to be started is judged by the main substrate 30 based on information on money being put in, another information and the like.

Then, signals from the judge circuit 26 and the main substrate 30 are supplied to an AND circuit 27 and by an output from the AND circuit 27, a switch 28 provided on a power source path to the video printer apparatus 21 from the above mentioned power source substrate 40 is on-and-off controlled. Meanwhile, a power source path for the coin counter 14 and the main substrate 30 or the like are separately provided.

Also, a power source is supplied to the judge circuit 26 and the AND circuit 27 by way of another power source path. Further, driving of the reading means 25 provided on an inner surface of the lid body 23 of the video printer apparatus 21 is conducted by, for example, a signal (power source) from the judge circuit 26.

Figure 6:
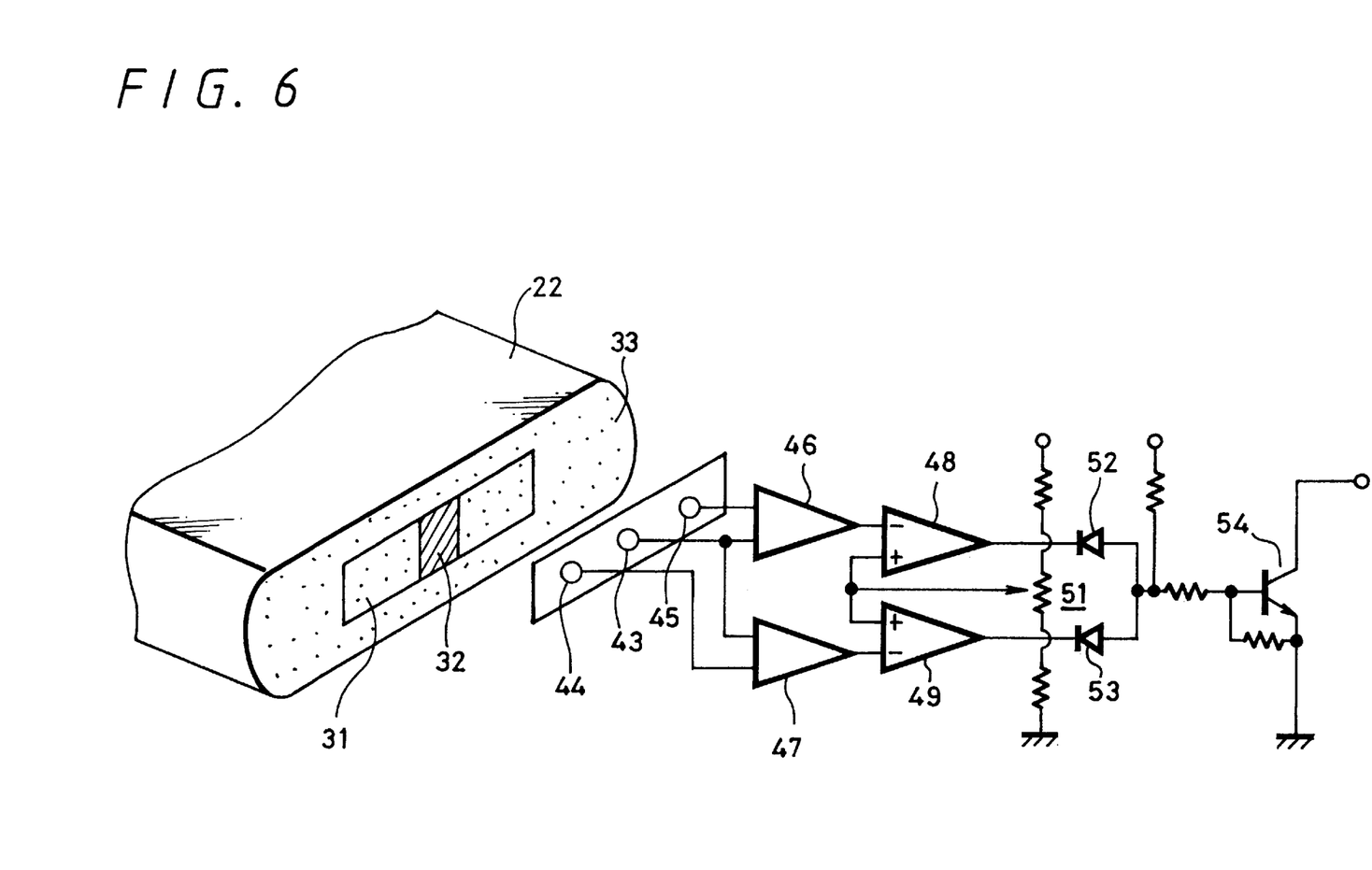
FIG. 6 is a further concrete circuit diagram of one part of FIG. 5.

Further, in the present apparatus, the above mentioned password means 24 and reading means 25 have an arrangement, for example, as shown in the FIG. 6. That is, in FIG. 6, the password means 24 is formed of, for example, an infrared rays reflecting aluminum foil 31 on which an infrared rays absorbing ink 32 is printed in a predetermined stripe pattern.

Then, the aluminum foil 31 is, for example, welded on an end surface of the cartridge 22 and at the same time, a surface of the cartridge 22 including the aluminum foil 31 is coated with, for example, coating varnish 33 or the like which penetrates therethrough only the infrared rays. As a result, the aluminum foil 31 becomes invisible by visible rays from its front.

Further, it is extremely difficult to peel off the aluminum foil 31 from the surface of the cartridge 22 and its forced peeling off destructs the aluminum foil 31 beyond possible repair. As a result, it becomes possible to protect a regular password means 24 from being abused and to keep the contents of the password means 24 in secret.

Figure 7:
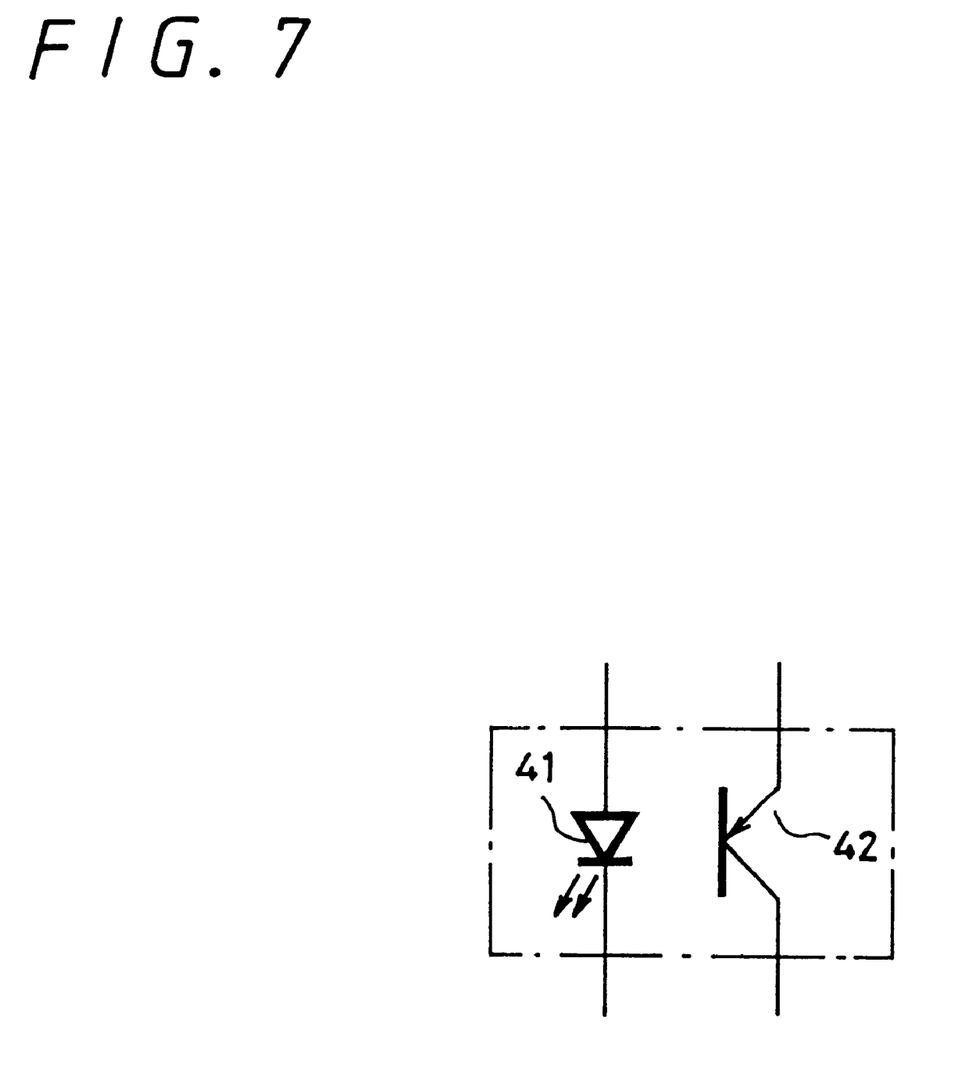
FIG. 7 is a diagram for the explanation of FIG. 6.

Meanwhile, as shown in FIG. 7, in the reading means 25 is used a photo-coupler which is provided with an infrared rays emission diode 41 and a photo-transistor 42 arranged in parallel. As against one stripe of the ink 32, for example, that absorbs infrared rays, a photo-coupler 43 corresponding to that stripe and photo-couplers 44, 45 corresponding to both sides of the stripe are provided.

Further, output of the photo-couplers 43, 45 and 43, 44 are respectively supplied to differential amplifiers 46, 47 and outputs of the differential amplifiers 46, 47 are compared with a reference voltage from a voltage dividing circuit 51 at respective comparators 48, 49. Then, outputs of the comparators 48, 49 are synthesized at the AND circuit consisting of diodes 52, 53 and a synthesized signal is derived through a buffer circuit consisting of a transistor 54.

As a result, in the reading means 25, by deriving differences between the outputs of the photo-couplers 43, 44 and 44, 45, dispersions in the photo-couplers and on a surface state of the password means 24 are absorbed, thereby making it possible to avoid erroneous detection and malfunction by the dispersion. Meanwhile, the practical password means 24 is further complex.

A signal from the reading means 25 is judged at the above mentioned judge circuit 26 and only when a regular cartridge 22 is loaded, a power source is applied to the video printer apparatus 21, thereby making it possible to eliminate a bad cartridge as well as prevent use of a pirate cartridge of inferior quality.

[0062]

Therefore, in the apparatus, by attaching the password means to the cartridge and allowing printing only when the password means is right, use of the pirate cartridge of bad quality can be prevented and an occurrence of a situation in which reliability of the apparatus is impaired can be prevented.

That is, according to the apparatus, even if an outer shape of the cartridge is imitated, the video printer apparatus is not driven in case a special password means is not attached to the cartridge, thereby making it possible to prevent use of the pirate cartridge of bad quality.

[0064]

As a result, in a conventional apparatus, when the pirate cartridge is used, it has been impossible to guarantee a printed photograph of good quality, and there has been a fear that reliability of the apparatus is impaired because an ink ribbon gets tangled, a print head is damaged and the like. According to the present invention, however, use of the pirate cartridge of bad quality can be prevented and fear of reliability of the apparatus being impaired can be eliminated.

Meanwhile, in the above mentioned apparatus, by conducting coating with coating varnish 33 and the like on all the surface of the cartridge, a position where the password means 24 (aluminum foil 31) is provided is made obscure and secrecy of the password means 24 is enhanced.

Further, in the above mentioned apparatus, the password means 24 can be provided not only on the cartridge 22 of the print materials but also on, for example, a cartridge for printing paper which is loaded onto the paper supplying tray 7. As a result, deterioration in quality owing to improperness of the print materials and printing paper can be prevented.

Also, in the pay photograph producing apparatus side, the present invention provides only the reading means 25 to be newly fixed on the lid body 23, the judge circuit 26 and the AND circuit 27, and can be easily applied to a conventional apparatus as long as the apparatus uses a cartridge for the print materials and/or printing paper.

According to the above mentioned pay photograph producing apparatus, in a pay photograph producing apparatus for conducting printing a picture of an optional video signal when money or its substitute is put in, by attaching the password means to a cartridge for print materials and/or a cartridge for printing paper, the means for reading the password means upon loading of the cartridge, and the means for allowing printing only when the password means is right, use of a pirate cartridge of bad quality can be prevented and a fear that reliability of the apparatus is impaired can be eliminated.

According to the invention, by attaching the password means to the cartridge and allowing printing only when the password means is right, use of the pirate cartridge of bad quality can be prevented and it becomes possible to prevent an occurrence of a situation in which reliability of the apparatus is impaired.

That is, according to the present invention, even if an outer shape of the cartridge is imitated, the video printer apparatus is not driven unless a special password means is attached to the cartridge, thereby making it possible to prevent use of the pirate cartridge having unsatisfactory quality.

As a result, when a pirate cartridge is used in a conventional apparatus, it has been impossible to guarantee a printed picture of good quality and at the same time, there has been a fear that a situation occurs in which reliability of the apparatus is impaired because of an ink ribbon getting tangled and damages to the print head and the like, whereas according to the present invention, it is possible to prevent use of the pirate cartridge of bad quality and eliminate a fear of reliability of the apparatus being impaired.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A pay photograph producing apparatus for printing a picture derived from a video signal when money or its substitute is put into said apparatus, comprising:

a password means attached to a cartridge for a printing material and/or a cartridge for a printing paper;

a means for reading said password means at a time of said cartridge being loaded;

a means for allocating said printing;

means for providing power to said means for reading at all times during operation of the apparatus; and means for providing power to said means for allocating said printing only when said password means is correct.

2. A pay photograph producing apparatus according to claim 1, wherein the means for reading said password means includes an arrangement of elements which receive and emit said invisible rays.

3. A pay photograph producing apparatus according to claim 2, wherein said elements are arranged to absorb dispersion among said elements.

4. A pay photograph producing apparatus according to claim 1, wherein said password means is attached to said cartridge in such a way that it is very difficult to remove and is destroyed beyond repair when removal is attempted.

5. A pay photograph producing apparatus according to claim 1, wherein said password means comprises an arrangement of a plurality of materials having different reflection factors relative to invisible rays and being covered with a material which transmits said invisible rays but does not transmit visible rays.

* * * * *